March 31, 1970 — W. P. LESTOQUE — 3,503,463
PIVOT STEERING TRACTOR

Filed July 7, 1966 — 2 Sheets-Sheet 1

INVENTOR.
Walter P. Lestoque
BY
Richard D. Law
ATTORNEY

March 31, 1970     W. P. LESTOQUE     3,503,463
PIVOT STEERING TRACTOR

Filed July 7, 1966     2 Sheets-Sheet 2

INVENTOR.
Walter P. Lestoque
BY
Richard D. Law
ATTORNEY

United States Patent Office 3,503,463
Patented Mar. 31, 1970

3,503,463
PIVOT STEERING TRACTOR
Walter P. Lestoque, Aurora, Colo., assignor, by mesne assignments, to The American-Coleman Company, Littleton, Colo., a corporation of Delaware
Filed July 7, 1966, Ser. No. 563,492
Int. Cl. B62d *11/00, 5/00*
U.S. Cl. 180—6.2                    9 Claims

ABSTRACT OF THE DISCLOSURE

A vehicle provided with at least two sets of steerable wheels, four steer wheels on two axles, two wheels of which may be arranged for conventional two wheel steering, and expandable tie rods on each set of wheels are arranged for moving the front two wheels into a toe-in-steering and the rear two wheels for toe-out-steering whereby the vehicle may be made to pivot around a center point between the two sets of wheels. A preferred form of the invention utilizes two sets of steerable drive wheels.

---

This invention relates to vehicles and more particularly to vehicles arranged for various types of steering from conventional two-wheel steering to four-wheel pivot steering.

In the design of many specialized vehicles in military, agricultural or industrial use optimum maneuverability is one criterion. Limited steering capabilities of such a vehicle imposes an untenable reduction of the vehicle's ability to perform the intended function; conversely, any improvement in the maneuverability of the vehicle enhances its utility. Some of the known attempts to increase vehicle maneuverability includes shortening the wheel base, articulating the frame, increasing the angle of the turn of the wheels, etc. Each of these means has provided some help, but each has certain defects such as reduced stability, reduced load carrying capacity, reduced economy, etc.

According to the present invention I have provided a vehicle which is arranged to provide a number of different types of steering including pivot steer. Pivot steer, as the name implies, is the ultimate in directional control of a wheeled vehicle. Where previous steering refinements have reduced the distance from the center of the turn circle to the center of the vehicle, pivot steering eliminates it and the vehicle pivots about the center of four wheels. With pivot steering a vehicle may be turned around in the same space as would be required if it were placed upon a turntable with the center of the vehicle above the center of the turntable. Pivot steering requires that four wheels of the vehicle be arranged for steering, and further be arranged to steer in opposite directions at the same time. Typical uses for this type of steering includes (a) agricultural tractors where tight turns are required at the end of the rows or where by lifting the implement in use and pivoting, making 90° sharp turns or 180° pivot turns and returning alongside the path previously taken, (b) industrial tractors, shovels and cranes and the like which must be operated in cramped construction sites between loads to be moved, digging and dumping areas, pick up and lower stations, etc., and (c) special trailer spotting tractors requiring high maneuverability for spotting trailers in congested, cramped areas, for example, on railroad flatbeds, in boats, ships and the like, and (d) aircraft and missile positioning vehicles.

Included among the objects and advantages of the present invention is a tractor arranged for pivot steering about the vertical center point through the vehicle.

Another object of the invention is to provide a vehicle having a plurality of means for steering for maximum maneuverability.

Another object of the invention is to provide a simplified and sturdy mechanism for pivot steering of the vehicle.

These and other objects and advantages of the invention may be readily ascertained by referring to the following description and appended illustrations in which:

FIG. 8 illustrates one effective use of the pivot steering in relation to a trailer.

The invention includes a vehicle having two steerable drive axles (having at least two wheels) each having a differential. Means are provided to lock out the input (drive line) shaft on both axles and at least one auxiliary drive is provided for the drive axle of one wheel of at least one of the drive axles for rotating the wheel in one direction while the differential rotates the other wheel in the opposite direction. For pivoting, one axle may be driven by an auxiliary motor and the other remaining free wheeling or both axles may be driven by synchronized motors.

Figure 1:
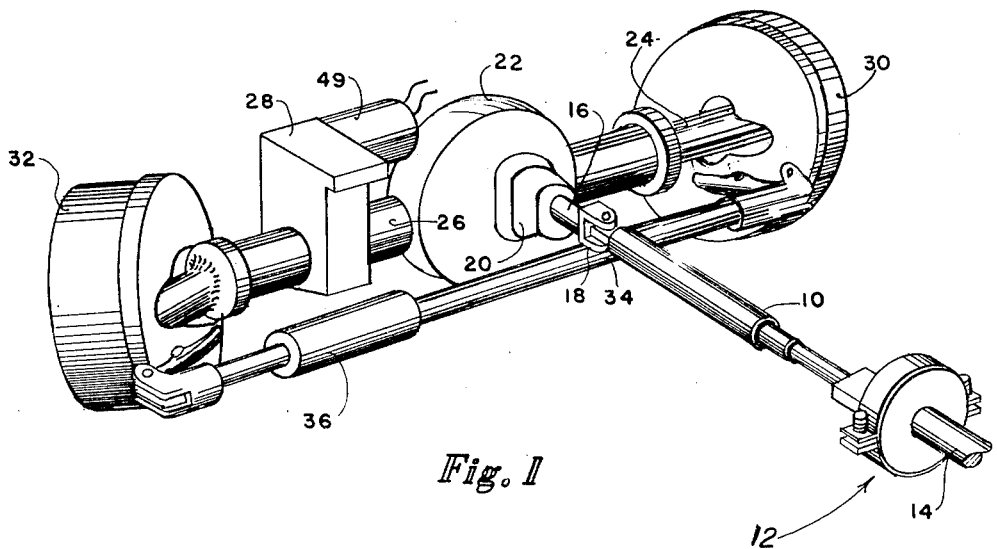
FIG. 1 is a perspective view of an axle and differential housing for a steerable drive axle arranged for pivot steering.

A steerable drive axle, as shown in FIG. 1, is arranged for turn movement of the wheels, both in opposite directions as well as in the same direction, and the wheels must rotate in different directions for pivoting, and in the same direction for forward or reverse travel. When the wheels are turned in opposite directions the wheels are arranged for pivotal movement of the truck or prime mover about a central point through the prime mover. A drive line 10 is attached to a drive line brake, shown in general by numeral 12, and another drive line portion 14. The portion 14 is arranged for connection to a transfer case, not shown, having provision for locking output shafts together, a differential lock, clutch, single shaft, etc., and a similar wheel and axle assembly on the other side, providing the four wheels of the vehicle. The drive line 10 is attached to a shaft 16 through a universal joint 18, the shaft 16 passes through a rotary seal 20 into the gearing in a differential housing 22. An axle housing 24 extends to one side of the differential housing and an axle housing 26 extends to the opposite side. An auxiliary drive housing 28 is mounted on the axle housing 26, the mechanism thereof being explained below. A steerable drive wheel and brake drum unit 30 is mounted on an end of axle 43 coming from the differential 22 and a similar wheel and drum unit 32 is mounted on the opposite end on axle 44. The two wheel units 30 and 32 are connected together by means of an extensible tie rod 34 which is provided with a hydraulic cylinder 36 for extending the rod to turn the wheels in opposite directions, as shown. The hydraulic cylinder 36 is arranged to extend the tie rod from a normal length where the wheels are in conventional steering position to the extended position where the wheels are toed outwardly in opposite directions. The necessary lines leading to the hydraulic cylinder are not shown since it may be a conventional hydraulic cylinder and the hydraulic lines thereto are conventional.

Figure 2:
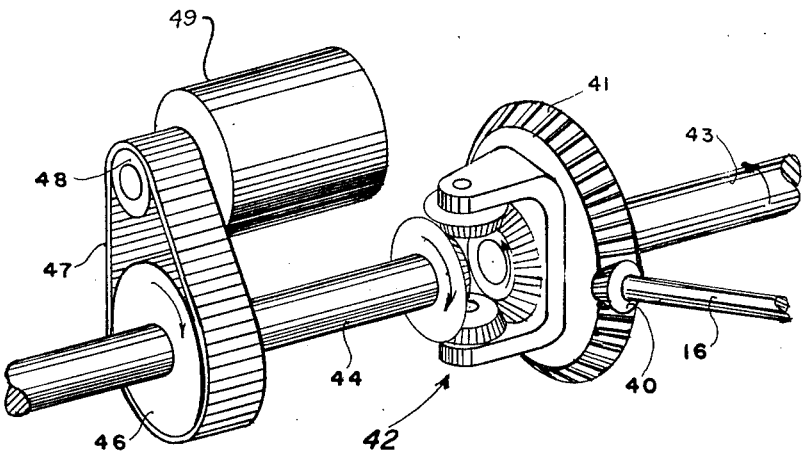
FIG. 2 is a detailed view of the drive mechanism for a pivot steering axle.

The operating mechanism in the differential housing 22 and the pivot steer axle housing 28 is shown in FIG. 2, where the driven line 16 is connected through a bevel pinion 40 to a bevel gear 41 which drives a differential, shown in general by numeral 42. The differential is a conventional differential gearing arrangement providing a differential drive for the axle shaft 43 extending to the wheel assembly 30 and the axle shaft 44 extending from the opposite side to the wheel assembly 32. The auxiliary drive includes a pulley 46 mounted on the axle shaft 44, and it is driven by a belt 47 mounted over a drive pulley 48. The drive pulley is driven by a shaft of an electric motor or a hydraulic motor 49. The auxiliary drive is arranged to rotate the wheels connected to the differential in opposite directions when the wheels are turned to opposite directions. When the four wheels, on two axles, are thus arranged it permits the pivoting of the vehicle about a central axis. The pulley 48 preferably includes an overrunning clutch which permits free wheeling of the belt drive 47 when the motor 49 is not under power.

Figure 7:
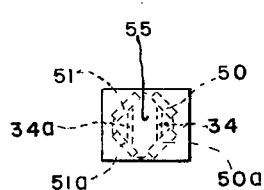
Figure 8:
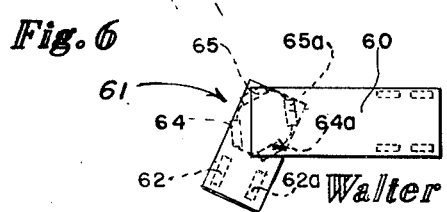

To pivot steer a vehicle about an axis passing through the central pivot point between the two axles on the vehicle, the vehicle is first stopped with its gear shift in neutral. The drive line brake is actuated to lock both drive lines from the transfer case in a non-rotating position. The hydraulic cylinder on each tie rod is actuated to move the wheels in opposite directions, as shown in FIG. 7, the tie rod 34 moves the wheels 50 and 50a in opposite directions and the tie rod 34a moves the wheels 51 and 51a in opposite directions, so that the wheels will pivot around an axis, in this case a vertical axis, through point 55. With the drive line 16 braked into non-rotating position, actuating the motor 49 turns the axle shaft 44 in one direction, as shown by the arrow, and the differential turns the axle 43 in the opposite direction, which is required for the pivotal movement about the axis point 55. The same opposite rotation is necessary for the other axle. The vehicle may be turned to any direction required, pivoting about the point 55 which is substantially centered between the two sets of wheels.

Figure 3:
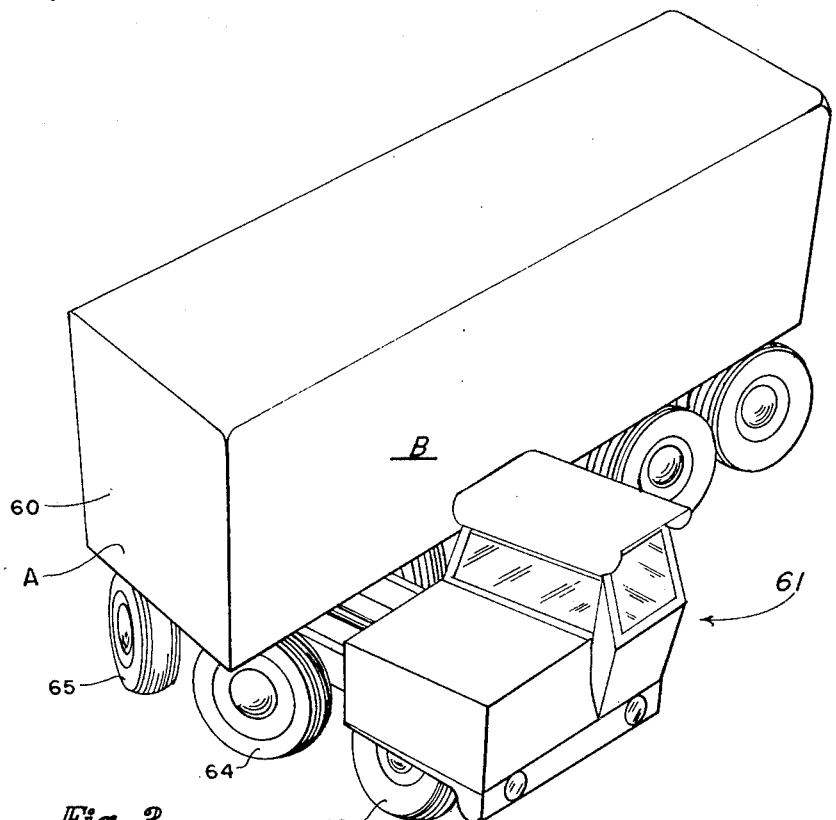
FIG. 3 is a perspective view of one form of tractor utilizing pivot steering for spotting a trailer.

In FIG. 3 one example of the use of a pivotal tractor is shown, where a semi-trailer 60 is mounted on a tractor, shown in general by numeral 61, which is provided with six wheels. The front wheels 62 are retractable so that the drive and steering wheels 64 and 65 may be made to pivot, as shown in FIG. 7. For normal use when the tractor is used without a trailer being hitched thereon, the two rear wheels may be moved to alignment with the frame, released so as to be follow drive wheels and the front wheels 62 steered in conventional manner. When it is desired or necessary to pivot the tractor, as for example from a front position at A to a side position at B, the pivot steering mechanism is actuated as outlined above, with the front wheels retracted.

Figures 4, 5:
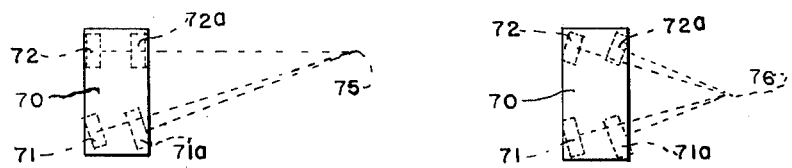
FIGS. 4, 5, 6, 7 and 8 are schematic views of different types of steering of a tractor showing in phantom lines the position of the wheels and the turning radius of such a vehicle.
Figure 6:
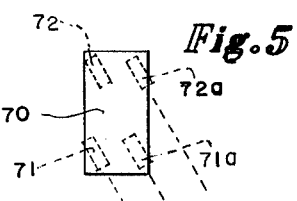

The steering of the vehicle having two steerable wheels is illustrated in FIG. 4. A tractor 70 having front wheels 71 and 71a and rear drive wheels 72 and 72a is arranged for conventional steering, which provides a radius of curvature of the turn extending to about a point 75, which is a considerable distance from the tractor. As shown in FIG. 5, a vehicle with four steerable wheels, the rear of which are turned in the opposite direction from the front, reduces the radius of turn considerably to a distance from the vehicle at about a point 76. With the four steerable wheels, the vehicle may be made to move obliquely, by turning the front and the rear wheels in the same direction, causing the truck to move obliquely instead of turning or moving straight in line with the frame.

The versatility of a vehicle having front and rear steerable drive wheels, or at least four steerable wheels, is illustrated in the diagrams of FIGS. 4 through 8. Particularly where pivot steering is possible a vehicle may be moved in almost any direction over a surface. The wheel base of the pivot unit may be increased by increasing the tun angle of the wheels, and the wheel base increases by the increase in the tangent of the angle of turn or by using a 40° turn wheel, the pivotable unit may have a 1.45 times longer wheel base than a pivotable unit equipped with 30° turn wheels.

The tractor with the retractable front wheels, as shown in FIG. 3, is only one form of a tractor utilizing the steerable front and rear drive wheels, additionally the motor for the drive axle may be an auxiliary engine or a power takeoff from the tractor's engine as well as the electric or hydraulic drive and the actuation and control of the expandable tie rod may be manual and/or remote.

I claim:
1. A wheeled vehicle having a frame and further comprising:
 (a) two steerable axles,
  (1) at least one of said axles being a drive axle,
  (2) said drive axle including a single differential,
 (b) engine means
 (c) a drive line
  (1) said drive line operatively connecting said engine means to said differential,
 (d) first expandable tie rods between a first pair of wheels mounted on a first of said steerable axles,
 (e) second expandable tie rods between a second pair of wheels mounted on a second of said steerable axles,
 (f) means for selectively expanding and contracting said expandable tie rod means for turning said first and second pairs of wheels to and from an inline to a diverging position,
 (g) whereby said vehicle may be pivoted around a point centerwise between said first and second axles by toeing in one of said pairs of wheels and toeing out another of said pairs of wheels,
 (h) brake means for selectively locking said drive line in a non-rotating position;
 (i) an axle housing on at least one of said axles,
 (j) auxiliary drive housing mounted on said axle housing,
  (1) said auxiliary drive housing enclosing motor means and drive means,
 (k) said motor means and drive means connected to said one of said axles for rotating one wheel of one said pair of wheels mounted thereon in one direction,
 (l) whereby said differential rotates the other wheel of said pair of wheels mounted on said one of said axles in the opposite direction.

2. A vehicle according to claim 1 further comprising pulley means mounted on said drive axle, second pulley means mounted on said motor means and connecting drive means between said first and second pulleys.

3. A vehicle according to claim 1 further comprising a second drive line and wherein both axles are drive axles and include differentials, said drive line and second drive line being connected each to a different differential.

4. A wheeled vehicle according to claim 1 wherein said expandable tie rod means are hydraulically actuated.

5. A wheeled vehicle according to claim 2 wherein said second pulley means has an override clutch so as to free wheel when said motor means is not in operation.

6. A wheeled vehicle according to claim 2 wherein said motor means is a hydraulic motor.

7. A wheeled vehicle according to claim 2 wherein said motor means is an electrical motor.

8. A wheeled vehicle according to claim 3 wherein said locking means is a brake on at least one of said drive lines from said motor means.

9. A wheeled vehicle according to claim 1 wherein said means for selectively expanding and contracting said tie rod means is remotely activated.

References Cited

UNITED STATES PATENTS

| | | | |
|---|---|---|---|
| 2,936,039 | 5/1960 | Rockwell | 180—79.2 |
| 3,315,759 | 4/1967 | Bohlen | 180—79.2 |
| 1,214,968 | 2/1917 | Steele | 180—45 |
| 3,255,840 | 6/1966 | Tangen | 180—45 |

LEO FRIAGLIA, Primary Examiner

L. DANIEL MORRIS, Jr., Assistant Examiner

U.S. Cl. X.R.

180—45, 79.2